No. 635,473. Patented Oct. 24, 1899.
C. P. GOERZ & E. VON HÖEGH.
THREE LENS SYSTEM FOR PHOTOGRAPHIC PURPOSES.
(Application filed Mar. 1, 1899.)
(No Model.)

Witnesses:
Richard Scherpe
Curt Gesell.

Inventors:
Carl Paul Goerz
and Emil von Höegh
by
Attorney.

UNITED STATES PATENT OFFICE.

CARL PAUL GOERZ AND EMIL VON HÖEGH, OF FRIEDENAU, GERMANY.

THREE-LENS SYSTEM FOR PHOTOGRAPHIC PURPOSES.

SPECIFICATION forming part of Letters Patent No. 635,473, dated October 24, 1899.

Application filed March 1, 1899. Serial No. 707,420. (No model.)

*To all whom it may concern:*

Be it known that we, CARL PAUL GOERZ and EMIL VON HÖEGH, citizens of the Kingdom of Prussia, and residents of Friedenau, near Berlin, in the Kingdom of Prussia and German Empire, have invented certain new and useful Improvements in Three-Lens Systems for Photographic Purposes, of which the following is a specification.

The object of the present invention is a new composite objective for photographic purposes, composed of three lenses, two of which are cemented together, the third being separated from the system composed in this way by a layer of air having the form of a positive meniscus.

Figure 1:
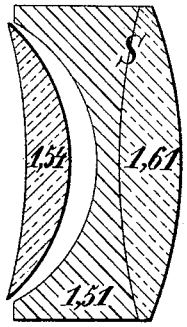
Figure 2:
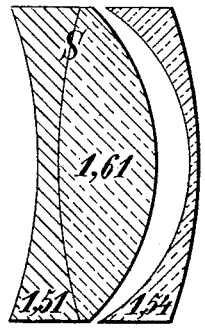

In the accompanying drawings, Figures 1 and 2 represent axial sections through two possible forms of the new composite lens.

In the present three-lens systems there is a lens of average refractive power inclosed between two other lenses, one of which is of smaller, the other one of higher, refractive power. The useful aperture of such composite systems and the intensity of the luminous rays passing it depend upon the value of the difference between the refractive indices of two neighboring lenses. The smaller this difference the smaller is also to be the radius of the curvature of the surface of the lens. If this were not the case, the elimination of the spheric and astigmatic aberration would not be possible. It is evident that there exists a certain minimum for the curvature which cannot be passed without impairing the sharpness of the images produced. The different kinds of glass preferably employed in the construction of such lenses have refractive indices between 1.51 and 1.61. It was mentioned before that the inclosed lens is to have a refractive index between those of the two other lenses. Consequently the differences of the indices of refraction between the central lens and the neighboring ones cannot possibly exceed the value of 0.05.

In order to obtain a greater power for concentrating the light without augmenting the number of the lenses composing the system and eliminating at the same time all errors and obtaining a very sharp image, we do not employ the cemented surface acting as a disperser, as hereinbefore described, but employ different radii for the curvature of the surfaces forming the collecting-surface S. We make the radius of the surface of the negative lens shorter than the one belonging to the neighboring surface of the positive lens, thereby leaving between the two lenses an air-space having the form of a positive meniscus. The consequence of this arrangement is that for compensating the spherical aberration we need no negative lens of higher refractive power than the positive one, or, in other words, that the glass of which the inclosed lens is formed has to be of refractive power the value of which lies between the corresponding values of the two other lenses. If the inclosed lens is, as shown in Fig. 1, a biconcave (negative) one, it may consist of material having very low refractive power. On the other hand, if the middle lens is a biconvex (positive) one the glass may be of the highest possible refractive index. In both cases the direct consequence is that two kinds of glass having a very great difference of the refractive indices are cemented together at the collecting-surface S, and it is obvious that the elimination of the astigmatic aberration is attained with a considerably greater radius of curvature of the surface of the lens.

Another important advantage resulting from the hereinbefore-described arrangement is that the new composite objective gives sharper images and has higher illuminating power. Furthermore, this arrangement allows the strict fulfilment of the so-called "sine" condition.

The numbers inscribed in the drawings signify the value of the refractive indices of the glass employed preferably for the manufacture of the respective lenses.

S is the cemented surface of the inclosed lens, which acts as a collector, whereas Z is the second one, acting as a disperser.

It is evident that two of the described three-lens systems may be united with each other to form a composite objective for photographic purposes.

What we claim is—

1. In a three-lens system for photographic purposes the combination with a lens, formed by cementing together a biconvex lens of high-refractive index and a biconcave lens of low-refractive index, of a meniscus the surface of which, facing the composite lens, is curved in such a way, as to leave between them an air-space, having the form of a positive meniscus; substantially as shown and described.

2. In a three-lens system for photgraphic purposes, the combination with a biconcave lens of low-refractive index, cemented to a biconvex lens of high-refractive index, of a positive meniscus, placed in front of the biconcvea lens; the surface of said meniscus facing the biconcave lens having a longer radius, than the opposite surface of the biconcave lens, substantially as shown and described.

In testimony whereof we affix our signatures in presence of two witnesses.

CARL PAUL GOERZ.
EMIL VON HÖEGH.

Witnesses:
HENRY HASPER,
WOLDEMAR HAUPT.